US010004262B2

(12) United States Patent
Xiang

(10) Patent No.: US 10,004,262 B2
(45) Date of Patent: Jun. 26, 2018

(54) ELECTRONIC CIGARETTE AND METHOD FOR SUPPLYING CONSTANT POWER THEREIN

(71) Applicant: HUIZHOU KIMREE TECHNOLOGY CO., LTD. SHENZHEN BRANCH, Shenzhen, Guangdong (CN)

(72) Inventor: Zhiyong Xiang, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 112 days.

(21) Appl. No.: 14/901,109

(22) PCT Filed: Jun. 26, 2013

(86) PCT No.: PCT/CN2013/078050
§ 371 (c)(1),
(2) Date: Dec. 28, 2015

(87) PCT Pub. No.: WO2014/205694
PCT Pub. Date: Dec. 31, 2014

(65) Prior Publication Data

US 2016/0143359 A1 May 26, 2016

(51) Int. Cl.
*A01G 13/06* (2006.01)
*A01M 13/00* (2006.01)
(Continued)

(52) U.S. Cl.
CPC ......... *A24F 47/008* (2013.01); *H05B 1/0227* (2013.01)

(58) Field of Classification Search
None
See application file for complete search history.

(56) References Cited

U.S. PATENT DOCUMENTS 6,040,560 A * 3/2000 Fleischhauer ......... A24F 47/008 128/202.21
6,688,313 B2 * 2/2004 Wrenn .................. A24C 5/478 131/194

(Continued)

FOREIGN PATENT DOCUMENTS

| | | |
|---|---|---|
| CN | 102940313 A | 2/2013 |
| CN | 102970885 A | 3/2013 |
| CN | 202890465 U | 4/2013 |

OTHER PUBLICATIONS

International Search Report of PCT Patent Application No. PCT/CN2013/078050 dated Apr. 3, 2014.

*Primary Examiner* — Thor Campbell

(57) ABSTRACT

An electronic cigarette and a method for supplying a constant power therein, the electronic cigarette comprises an atomizer with a heating wire. The electronic cigarette also comprises a power supply module for supplying power to the heating wire to heat the heating wire, and further comprises a microprocessor, a detecting module connected to the microprocessor, and a voltage adjusting module. A preset constant power can supply to the heating wire of the atomizer in the electronic cigarette, so that a consistent heating power can be applied to each of the electronic cigarettes produced in batch production, and smoke amount and flavor of each of the electronic cigarettes are more consistent, thereby better meeting demands of consumers.

3 Claims, 3 Drawing Sheets

(51) Int. Cl.
*A24F 47/00* (2006.01)
*H05B 1/02* (2006.01)

(56) References Cited

U.S. PATENT DOCUMENTS

| | | | | | |
|---|---|---|---|---|---|
| 9,596,884 | B2* | 3/2017 | Liu | A24F 47/008 | |
| 2002/0005207 | A1* | 1/2002 | Wrenn | A24C 5/478 | 131/194 |
| 2004/0020500 | A1* | 2/2004 | Wrenn | A24C 5/478 | 131/194 |
| 2014/0020693 | A1* | 1/2014 | Cochand | A61M 11/041 | 131/273 |
| 2014/0366894 | A1* | 12/2014 | Liu | A24F 47/008 | 131/328 |
| 2015/0313284 | A1* | 11/2015 | Liu | A24F 47/008 | 131/329 |
| 2016/0143359 | A1* | 5/2016 | Xiang | A24F 47/008 | 392/387 |
| 2016/0206003 | A1* | 7/2016 | Yamada | A24F 47/008 | |
| 2016/0213066 | A1* | 7/2016 | Zitzke | A24F 47/008 | |
| 2016/0360786 | A1* | 12/2016 | Bellinger | A24F 47/008 | |
| 2017/0071259 | A1* | 3/2017 | Yamada | A24F 47/008 | |
| 2017/0231276 | A1* | 8/2017 | Mironov | A24F 47/008 | 131/328 |

* cited by examiner

ELECTRONIC CIGARETTE AND METHOD FOR SUPPLYING CONSTANT POWER THEREIN

FIELD OF THE INVENTION

The present application relates to the field of electronic cigarettes, and more particularly relates to an electronic cigarette and a method for supplying a constant power in the electronic cigarette.

BACKGROUND OF THE INVENTION

The electronic cigarette is used to turn the smoke liquid into vapor, and provide a tobacco alternative for the smoker. When the electronic cigarette works, it needs to supply a power to the atomizer, and heat the heating wire of the atomizer in order to heat the liquid and generate vapor. At present, the battery in the electronic cigarette is used to supply power to the atomizer. The power supply mode includes full power output or constant voltage output, which the output power varies with the load resistance of the heating wire. When the full power output is provided, the output power decreases with the decrease of the battery voltage. When the constant voltage output is provided, the output power of the electronic cigarette varies with the resistance of the heating wire.

When the electronic cigarettes produced in batch production, the resistance of the heating wire of each electronic cigarette is different, and the power supply mode above-mentioned produced different heating power for each electronic cigarette, so that smoke amount and flavor of each of the electronic cigarettes are not consistent, thereby failed to meet the consumers.

SUMMARY OF THE INVENTION

The objective of the present application is to provide an improved electronic cigarette and a method for supplying a constant power in the electronic cigarette, aiming at the drawbacks in the prior art.

In accordance with one aspect of the present application, there is provided an electronic cigarette, which comprises an atomizer with a heating wire, a power supply module for supplying power to the heating wire to heat the heating wire, a microprocessor, a detecting module and a voltage adjusting module, the microprocessor is electrically connected to the detecting module and the voltage adjusting module respectively, wherein the detecting module is configured for real-timely detecting actual heating current and voltage to the heating wire; the microprocessor is configured for receiving the actual heating current detected by the detecting module and obtaining a standard heating voltage according to the actual heating current; the microprocessor is further configured for comparing a standard heating voltage with the actual heating voltage detected by the detecting module, determining whether the standard heating voltage is different from the actual heating voltage, and controlling the voltage adjusting module to adjust the actual heating voltage being equal to the standard heating voltage in order to make heating power be equal to a preset constant power.

In one embodiment, the microprocessor is further configured for generating and storing a corresponding table with heating voltage and current, a power obtained by multiplying any heating voltage with a corresponding heating current in the table is equal to the preset constant power. The microprocessor is configured for obtaining a heating voltage corresponding to the actual heating current in the table; the heating voltage is used as the standard heating voltage.

In this embodiment, the detecting module includes a voltage detecting module, a current detecting module and a current signal amplifying circuit; the voltage detecting module is configured for detecting the actual heating voltage when the power supply module supplies power to the heating wire; the current detecting module is configured for detecting the actual heating current when the power supply module supplies power to the heating wire. The current signal amplifying circuit is configured for amplifying the actual heating current detected by the current detecting module.

Yet in this embodiment, the model of the microprocessor is SN8P2711B, the voltage adjusting module includes a first MOSFET Q1.

In another embodiment, advantageously, the microprocessor is further configured for presetting and storing a constant power, the microprocessor is used to calculate a voltage according to the actual heating current detected by the detecting module and the constant power, and the voltage will be used as the standard heating voltage.

In this embodiment, the microprocessor calculates the standard heating voltage through following formula: $P=U\times I$, wherein, P represents the preset constant power, I represents the actual heating current detected by the detecting module, U represents the standard heating voltage.

Yet in this embodiment, the detecting module includes a voltage detecting module, a current the detecting module and a current signal amplifying circuit; the voltage detecting module is configured for detecting the actual heating voltage when the power supply module supplies power to the heating wire; the current detecting module is configured for detecting the actual heating current when the power supply module supplies power to the heating wire, wherein, the model of the microprocessor is SN8P2711B, the voltage adjusting module includes a first MOSFET Q1.

In another embodiment, the electronic cigarette further comprising a smoking signal detection module which is used to detect a smoking signal, the microprocessor is configured for controlling the power supply module to supply power to the heating wire when the smoking signal is detected. The smoking signal detection module is air pressure sensor or switch.

In according with another aspect of the present application, there is provided a method for supplying a constant power of the electronic cigarette, the electronic cigarette comprising a microprocessor, an atomizer with a heating wire, a power supply module for supplying power to the heating wire to make the heating wire be heated, wherein the method comprises: detecting an actual heating current and voltage real-timely, obtaining a standard heating voltage according to the actual heating current, comparing the standard heating voltage with the actual heating voltage, determining whether the standard heating voltage is different from the actual heating voltage, and adjusting the actual heating voltage being equal to the standard heating voltage in order to make heating power be equal to a preset constant power.

In this embodiment, the method further comprises: generating and storing a corresponding table with heating voltage and current, a power obtained by multiplying any heating voltage with a corresponding heating current in the table is equal to the preset constant power; and obtaining a heating voltage corresponding to the actual heating current in the table, the heating voltage is used as the standard heating voltage.

Yet in this embodiment, the method further comprises: presetting and storing a constant power; calculating a voltage according to the actual heating current and the constant power, and the voltage is used as the standard heating voltage.

When implementing the electronic cigarette and the method for supplying a constant power of the electronic cigarette of the present application, the following advantageous can be achieved: a preset constant power can be supplied to the heating wire of the atomizer in the electronic cigarette, so that a consistent heating power can be applied to each of the electronic cigarettes produced in batch production, and smoke amount and flavor of each of the electronic cigarettes are more consistent, thereby better meeting demands of consumers.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

To make the technical feature, objective and effect of the present application be understood more clearly, now the specific implementation of the present application is described in detail with reference to the accompanying drawings and embodiments.

Figure 1:
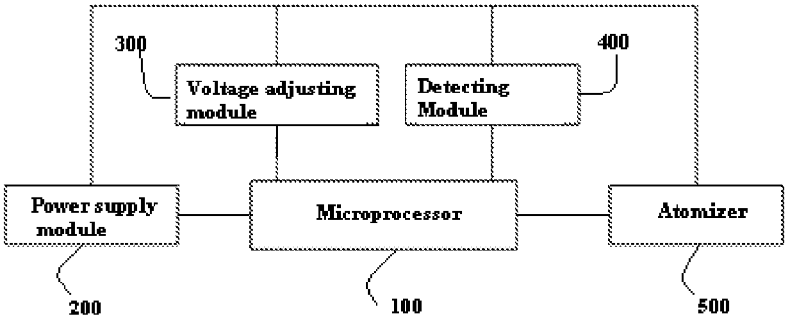
FIG. 1 illustrates a structural schematic view of an electronic cigarette of the present application.

FIG. 1 shows an electronic cigarette according to an embodiment of the present application. The electronic cigarette comprises a microprocessor 100, a power supply module 200, a voltage adjusting module 300, a detecting module 400 and an atomizer 500. The power supply module 200 is electrically connected to the microprocessor 100 and the atomizer 500 respectively. The voltage adjusting module 300 is electrically connected to the microprocessor 100 and the power supply module 200 respectively. The detecting module 400 is electrically connected to the microprocessor 100, the power supply module 200 and the atomizer 500 respectively.

The atomizer 500 includes a heating wire (not shown in FIG. 1.) which is electrically connected to the power supply module 200. When the power supply module supplies power to the heating wire, the heating wire makes the smoke liquid of the electronic cigarette turn into vapor.

The detecting module is configured for real-timely detecting actual heating current and heating voltage to the heating wire. The microprocessor 100 is configured for obtaining the actual heating current detected by the detecting module 400 and determining a standard heating voltage according to the actual heating current; the microprocessor is further configured for comparing the standard heating voltage with the actual heating voltage detected by the detecting module, determining whether the standard heating voltage is different from the actual heating voltage, and controlling the voltage adjusting module 300 to adjust the actual heating voltage being equal to the standard heating voltage in order to make heating power to the heating wire be equal to a preset constant power.

In this embodiment of the present application, there are two ways to obtain the standard heating voltage:

1、The microprocessor 100 generates and stores a corresponding table with heating voltage and current, a power obtained by multiplying any heating voltage with a corresponding heating current in the table is equal to the preset constant power.

Specifically, the microprocessor 100 generates the constant power corresponding table with heating voltage and current based on pre-setting constant power and calculation formula $P=U\times I$.

When the electronic cigarette works and the power supply module 200 supplies power to the atomizer 500, the detecting module 400 detects an actual heating current, and the microprocessor 100 obtains a heating voltage corresponding to the actual heating current in the table, the heating voltage is used as the standard heating voltage.

As shown in table 1, the microprocessor 100 in this embodiment of the present application is configured for generating and storing a corresponding table with heating voltage and current. The heating voltage and current in the table 1 should be set according to resistance value of the heating wire.

TABLE 1

| | | | | |
|---|---|---|---|---|
| Voltage (V) | 3.1-3.2 | 2.8-3.1 | 2.4-2.8 | . . . |
| Current (A) | 0.5-0.55 | 0.55-0.6 | 0.6-0.65 | . . . |
| Power (W) | 1.6 | 1.6 | 1.6 | 1.6 |

2、The microprocessor 100 presets and stores a constant power $P_O$(W), which used to calculate a voltage used as the standard heating voltage according to the formula $P=U\times I$, wherein P is $P_O$, I represents the actual heating current $I_0$ detected by the detecting module 400.

In this embodiment of the present application, the microprocessor 100 is used to control the voltage adjusting module 300 to adjust the actual heating voltage, which is implemented by following manner:

If the actual heating voltage detected is greater than the standard heating voltage, it illustrates that the heating power outputted by the power supply module 200 is higher than the preset constant power, it is needed to lower the actual heating voltage to make the heating power outputted by the power supply module 200 be reduced. Therefore, the voltage adjusting module 300 lowers the actual heating voltage to the heating wire so that a preset constant power can be supply to the heating wire of the atomizer in the electronic cigarette.

If the actual heating voltage detected is less than the standard heating voltage, it illustrates that the heating power outputted by the power supply module 200 is less than the preset constant power, and it is needed to raise the actual heating voltage to make the heating power outputted by the power supply module 200 be increased.

The voltage adjusting module 300 raises the actual heating voltage to the heating wire so that a preset constant power can be supply to the heating wire of the atomizer in the electronic cigarette.

Figure 2:
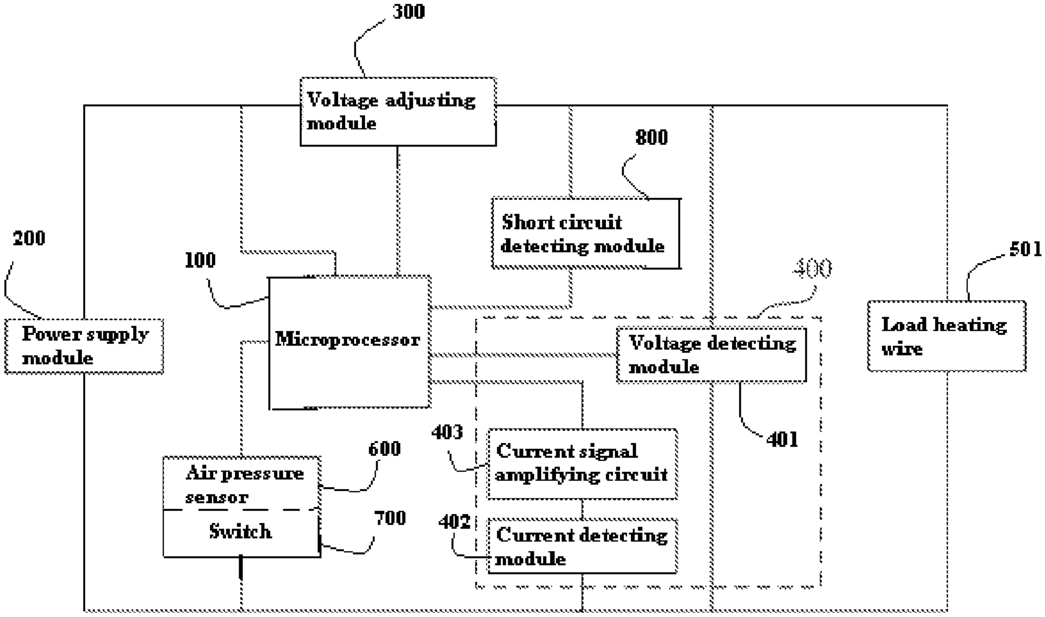
FIG. 2 illustrates a detailed structural schematic view of an electronic cigarette of the present application.

Referring to FIG. 2, it shows a detailed structural schematic view of an electronic cigarette which can supply a constant power. The heating wire 501 in FIG. 2 is the heating wire of the atomizer 500. The detecting module 400 includes the voltage detecting module 401 and the current detecting module 402. The power supply module 200 of the electronic cigarette supplies a smaller working current to the heating wire 501, therefore the detecting module 400 further includes a current signal amplifying circuit 403 in order to make the heating current detecting result detected by the current detecting module 402 is more accurate. The current signal amplifying circuit 403 amplifies the actual heating current detected by the current detecting module 402 and transmits it to an I/O interface of the microprocessor 100.

In this embodiment of the present application, there are two way to obtain the preset heating voltage if the amplified actual heating current is transmitted to the microprocessor 100, for the first way, the corresponding table with heating voltage and current being stored in the microprocessor 100 should be a corresponding table with amplified heating current and heating voltage. For the second way, the preset constant power is based on the amplified heating current to be preset and stored, i.e. I should be amplified current in the formula $P=U\times I$, wherein P should be a corresponding power being relative to the amplified current.

Referring to FIG. 2, the electronic cigarette according to an embodiment of the present application further comprises a smoking signal detection module (not shown in FIG. 2) and short circuit detecting module 800. The smoking signal detection module comprising air pressure sensor 600 or switch 700 is used to detect a smoking signal. The microprocessor 100 controls the power supply module 200 supplying power to the heating wire 501 when the smoking signal detection module detects a smoking signal.

Referring to FIG. 2, the working process of the electronic cigarette of the present invention is as follows: the smoking signal or key signal is transmitted to the microprocessor 100 when the smoking signal (that is, when the user is smoking) is detected by the air pressure sensor 600 or a key signal is detected by the switch. The microprocessor 100 controls the power module 200 to connect with the heating wire 501 in order to turn the smoke liquid of the electronic cigarette into vapor and then simulated the smoking process.

The voltage detecting module 401 detects the actual heating voltage and transmits it to the microprocessor 100 when the power supply module 200 supplies power to the heating wire; the current detecting module 402 detects the actual heating current $I_1$, the current signal amplifying circuit 403 amplifies the actual heating current $I_1$ detected by the current detecting module 402 and transmits an amplified current $I_2$ to the microprocessor 100. According to the heating current $I_2$, the microprocessor 100 can obtain a standard heating voltage $U_0$ by using the corresponding table with heating voltage and current or by calculating; the microprocessor 100 is used to compare the standard heating voltage $U_0$ with the actual heating voltage $U_1$, if $U_1>U_0$, the microprocessor 100 controls the voltage adjusting module 300 to lower the actual heating voltage. If $U_1<U_0$, the microprocessor 100 controls the voltage adjusting module 300 to raise the actual heating voltage, so that a consistent heating power can be applied to the electronic cigarette.

The short circuit detecting module 800 is used to detect the failure of shortcut when the power supply module 200 supplies power to the heating wire. If the failure of shortcut happens, the microprocessor 100 is used to disconnect with the power supply module 200.

Figure 3:
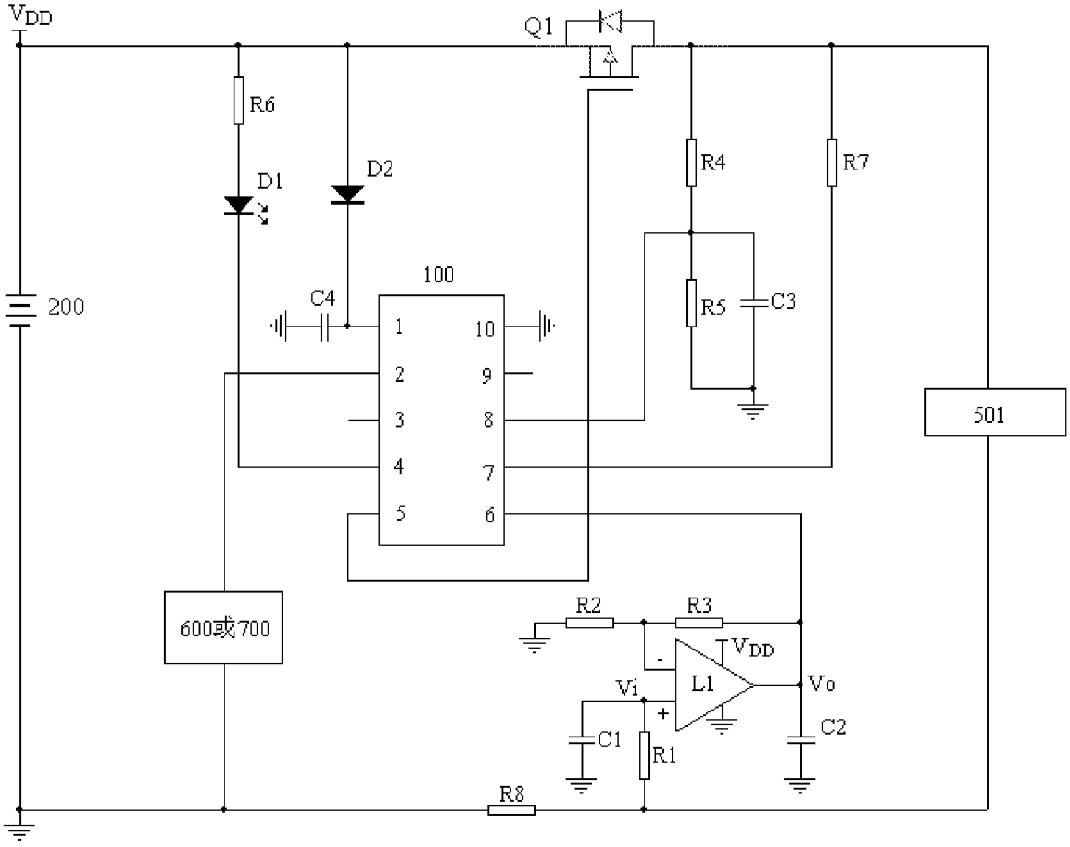
FIG. 3 illustrates circuit schematic view of the an electronic cigarette of the present application.

Referring to FIG. 3 illustrates circuit schematic view of the electronic cigarette of the present application. In this embodiment of the present application, the model of the microprocessor is SN8P2711B, the power supply module 200 is a battery, and the voltage adjusting module includes a first MOSFET Q1.

Referring to FIG. 3, the source of the first MOSFET is electrically connected to positive of the power supply module 200, the drain of the first MOSFET is electrically connected to the heating wire 501, and the grid of the first MOSFET is electrically connected to first pulse output of the microprocessor 100 (i.e. fifth pin of the microprocessor). The eighth pin of the microprocessor 100 is grounded via the fifth resistor and capacitance C3, and is connected to the drain of the first MOSFET Q1 and the heating wire 501 via the forth resistor R4, the eighth pin of the microprocessor 100 is configured for detecting the heating voltage. The seventh pin of the microprocessor 100 is electrically connected to the drain of the first MOSFET Q1 and the heating wire 501 via a resistor R7, the seventh pin of the microprocessor 100 is configured for detecting the short circuit. The sixth pin of the microprocessor 100 is connected to output terminal of the operational amplifier L1 and grounded via Capacitor C2.

The homo-phase input terminal of the operational amplifier L1 is connected to the heating wire 501 via the first resistor R1, and the negative of the power supply module via resistor R1 and resistor R2 being series with the resistor R1, as well as grounded via capacitor C1; the anti-phase input terminal of the operational amplifier L1 is grounded via the second resistor R2 and is connected to the homo-phase input terminal of the operational amplifier L1 via the third resistor R3; the positive power end of the operational amplifier L1 is connected to VDD (voltage of the VDD is 5V), the negative power end of the operational amplifier L1 is grounded.

The second pin of the microprocessor is connected to one end of the air pressure sensor or switch, the other end of air pressure sensor or switch is connected to the power supply module 200. The first pin of the microprocessor 100 is connected to cathode of diode D2, and grounded via a capacitor C4. The anode of the diode D2 is connected to the positive of the power supply module 200 and the source of the MOSFET Q1. The tenth pin of the microprocessor 100 is grounded. The forth pin of the microprocessor 100 is connected to the cathode of Light emitting diode D1, the anode of D1 is connected to an end of resistor R6, the other end of the resistor R6 is connected to the positive of the power supply module 200 and the source of the MOSFET Q1.

In this embodiment of the present application, the light emitting diode D1 is used to display various operating conditions of the electronic cigarette. For example, when the pressure sensor 600 detects a smoking signal, the forth pin of the microprocessor 100 can control a pulse signal and make the light emitting diode D1 gradual brightness in order to show the electronic cigarette in the smoking condition. Or when the pressure sensor 600 detects a signal of stopping smoking, the forth pin of the microprocessor 100 can control the light emitting diode D1 with a gradual darkness indicating the electronic cigarette with a stop smoking state.

In this embodiment of the present application, the diode D2 is used to prevent the power supply module 200 from reverse connection. If the power supply module 200 is connected in reverse, the diode D2 is cut off and it plays a role in protecting the microprocessor 100. When the smoking signal detected by the air pressure sensor 600 or input signal detected by the switch 700, the air pressure sensor 600 or the switch 700 outputs a signal (such as in a high level) to the second pin of the microprocessor 100. The microprocessor 100 controls MOSFET Q1 turning on and connecting the power supply module 200 to the heating wire 501; if the short circuit (the voltage detected by the seventh pin of the microprocessor 100 is zero) happens when the power is supplied, the microprocessor 100 controls the voltage in the fifth pin connected to MOSFET Q1 to turn off MOSFET Q1 in order to disconnect the power supply module 200 to the heating wire 501. The actual heating current $I_1$ from the power supply module 200 to the heating wire 501 can be detected by resistor R1. The current signal amplifying circuit 403 is composed of resistor R2, resistor R3, capacitor C1, the operational amplifier L1, and capacitor C2, the current signal amplifying circuit 403 can amplify the actual heating current $I_1$ and transmit it to the sixth pin of the microprocessor 100. According to the current in the sixth pin, the microprocessor 100 obtains the standard heating voltage $U_0$ by using the corresponding table with heating voltage and heating current or the microprocessor 100 calculates the standard heating voltage $U_0$. The voltage detecting module 401 being composed of resistor R4, resistor R5 and capacitor C3 is used to detect the actual heating voltage and transmit it to the eighth pin of the microprocessor 100; the microprocessor 100 compares the standard heating voltage $U_0$ with the actual heating voltage $U_1$ received by the eighth pin of the microprocessor 100, if the actual heating voltage $U_1$ is greater than the standard heating voltage $U_0$, the microprocessor 100 adjusts a pulse signal outputted from its fifth pin to MOSFET Q1 to lower the actual heating voltage outputted by the MOSFET Q1. If the actual heating voltage $U_1$ is less than the standard heating voltage $U_0$, the microprocessor 100 adjusts a pulse signal outputted from its fifth pin to MOSFET Q1 to raise the actual heating voltage outputted by the MOSFET Q1, so that a constant power of the power supply module 200 can be supply to the heating wire 501.

Figure 4:
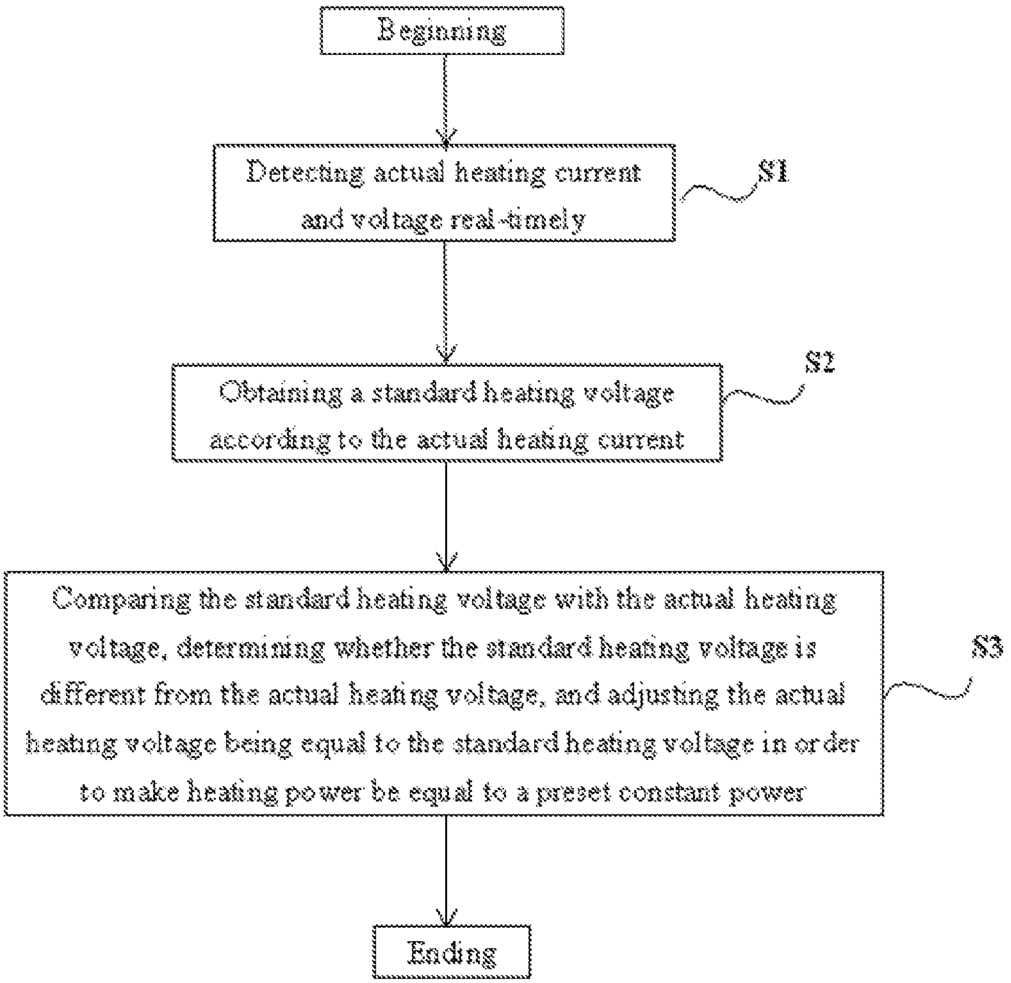
FIG. 4 illustrates a flow chart of the method for outputting a constant power of the electronic cigarette of the present application.

Referring to FIG. 4, it shows a flow chart of the method for outputting a constant power of the electronic cigarette of the present application. In this embodiment of the present application, the electronic cigarette comprises the atomizer with the heating wire, the microprocessor and power supply module for supplying power to the heating wire to make the heating wire be heated. A method for supplying a constant power in the electronic cigarette comprises:

S1、detecting actual heating current and voltage realtimely;

S2、obtaining a standard heating voltage according to the actual heating current;

S3、comparing the standard heating voltage with the actual heating voltage, determining whether the standard heating voltage is different from the actual heating voltage, and adjusting the actual heating voltage being equal to the standard heating voltage in order to make heating power be equal to a preset constant power.

It should be understood that the above steps S2 and S3 can be performed by the microprocessor to achieve its function. Step S1 can be realized by voltage and current detecting modules. In this embodiment of the present application, there are two ways to obtain the standard heating voltage in step S2 as following:

1、The microprocessor 100 is used to generate and store a corresponding table with heating voltage and current, a power obtained by multiplying any heating voltage with a corresponding heating current in the table is equal to the preset constant power.

Specifically, the microprocessor 100 generates the corresponding table with heating voltage and current in the constant power condition according to preset constant power and formula P=U×I.

When the electronic cigarette works and the power supply module supplies the power to heating wire, the microprocessor obtains a standard heating voltage corresponding to the actual heating current I1 in the table, the heating voltage U0 is used as the standard heating voltage.

2、The microprocessor 100 is used to preset and store a constant power $P_0$ (W), when the actual heating current $I_1$ is detected, the microprocessor calculates a voltage according to formula P=U×I, and the voltage will be used as the standard heating voltage $U_0$, wherein, P is $P_0$, I is the actual heating current $I_1$ detected by the detecting module.

In this embodiment of the present application, the actual heating current $I_1$ is small when the electronic cigarette is working, therefore the actual heating current detected is firstly amplified then the standard heating voltage is obtained from a corresponding table, the corresponding table with amplified heating current and heating voltage is preset in the microprocessor, also the constant power $P_0$ preset in the microprocessor is based on the amplified heating current.

The method for supplying a constant power in the electronic cigarette is realized by firstly detect actually heating current and voltage, then using the corresponding table to inquiry and obtain a standard heating voltage, or calculating a standard heating voltage according to preset constant power. In this embodiment of the present application, the smoking signal or key signal is transmitted to the microprocessor which controls the electronic cigarette turning on/off according detecting signal from an air pressure sensor or key. When the detecting signal is received, the microprocessor controls connecting the power module with the heating wire, at same time the actual heating current detected by the current detecting module 402 and amplified by the current signal amplifying circuit 403 is transmitted to the microprocessor which inquiries and obtains a standard heating voltage from the corresponding table, or calculating a standard heating voltage, and an actual heating voltage detected by the voltage detecting module 401 is transmitted to the microprocessor which comparing the standard heating voltage with the actual heating voltage, determining whether the standard heating voltage is different from the actual heating voltage, and adjusting the actual heating voltage being equal to the standard heating voltage in order to make heating power be equal to a preset constant power. RMS value of the PWM pulse outputted from the microprocessor is used to adjust the actual heating voltage.

The electronic cigarette according to an embodiment of the present application further comprises short circuit detecting module which is used to detect the failure of shortcut when the power supply module supplies power to the heating wire to protect the electronic cigarette.

The electronic cigarette and method for supplying constant power therein according to an embodiment of the present application, which can supply a preset constant power, so that a consistent heating power can be applied to each of the electronic cigarettes produced in batch production, and smoke amount and flavor of each of the electronic cigarettes are more consistent, thereby better meeting demands of consumers.

Although the present application is illustrated with the embodiments accompanying the drawings, the present application is not limited to the above-mentioned specific embodiments, and the above-mentioned embodiments are only for illustration, not for limitation. In the inspiration of the present application, those skilled in the art may make many modifications, without going beyond the purpose and the scope the claims intend to protect of the present application; all these belong to the protection of the present application.

What is claimed is:

1. An electronic cigarette, comprising an atomizer with a heating wire, a power supply module for supplying power to the heating wire to heat the heating wire, a microprocessor, a detecting module and a voltage adjusting module, the microprocessor is electrically connected to the detecting module and the voltage adjusting module respectively, wherein the electronic cigarette further comprising a smoking signal detection module which is used to detect a smoking signal, and a short circuit detecting module configured to detect the failure of shortcut when the power supply module supplies power to the heating wire;

wherein, the detecting module is configured for real-timely detecting actual heating current and heating voltage to the heating wire;

the microprocessor is configured for receiving the actual heating current detected by the detecting module and obtaining a standard heating voltage according to the actual heating current; the microprocessor is further configured for controlling the power supply module to supply power to the heating wire when the smoking signal is detected;

the microprocessor is further configured for comparing the standard heating voltage with the actual heating voltage detected by the detecting module, determining whether the standard heating voltage is different from the actual heating voltage, and controlling the voltage adjusting module to adjust the actual heating voltage being equal to the standard heating voltage in order to make heating power to the heating wire be equal to a preset constant power; an effective voltage value of the PWM pulse outputted from the microprocessor is used to adjust the actual the heating voltage;

wherein the detecting module includes a voltage detecting module, a current the detecting module and a current signal amplifying circuit;

the voltage detecting module is configured for detecting the actual heating voltage when the power supply module supplies power to the heating wire;

the current detecting module is configured for detecting the actual heating current when the power supply module supplies power to the heating wire;

the current signal amplifying circuit is configured for amplifying the actual heating current detected by the current detecting module;

wherein the microprocessor is further configured for generating and storing a corresponding table with a heating voltage and an amplified heating current, a power obtained by multiplying any heating voltage with a corresponding heating current in the table is equal to the preset constant power;

the microprocessor is configured for obtaining a heating voltage corresponding to the amplified heating current in the table, the heating voltage is used as the standard heating voltage;

the model of the microprocessor is SN8P2711B;

the voltage adjusting module includes a first MOSFET Q1, a source of the first MOSFET is electrically connected to a positive of the power supply module, a drain of the first MOSFET is electrically connected to the heating wire, and a grid of the first MOSFET is electrically connected to a fifth pin of the microprocessor;

wherein the current detecting module includes a first resistor, the current signal amplifying circuit includes an operational amplifier, a second resistor and a third resistor, the voltage detecting module includes a forth resistor and a fifth resistor;

wherein a sixth pin of the microprocessor is connected to output terminal of the operational amplifier, a homophase input terminal of the operational amplifier is connected to the heating wire and a negative of the power supply module via the first resistor, an anti-phase input terminal of the operational amplifier is grounded via the second resistor and is connected to the homophase input terminal of the operational amplifier via the third resistor;

an eighth pin of the microprocessor is grounded via the fifth resistor, and is connected to the drain of the first MOSFET and the heating wire via the forth resistor;

a first pin of the microprocessor is connected to a cathode of diode D2, and grounded via a capacitor; an anode of the diode D2 is connected to the positive of the power supply module and a source of the MOSFET Q1; a tenth pin of the microprocessor is grounded;

wherein a forth pin of the microprocessor is connected to a cathode of a light emitting diode D1, an anode of the light emitting diode D1 is connected to an end of resistor R6, the other end of the resistor R6 is connected to the positive of the power supply module and the source of the MOSFET Q1.

2. The electronic cigarette according to claim 1, wherein the smoking signal detection module is air pressure sensor or switch.

3. A method for supplying a constant power in an electronic cigarette, the electronic cigarette comprising a microprocessor, an atomizer with a heating wire, a power supply module for supplying power to the heating wire to make the heating wire be heated, wherein the method comprises:

detecting actual heating current and voltage real-timely and amplifying the actual heating current;

generating and storing a corresponding table with heating voltage and the amplified heating current, a power obtained by multiplying any heating voltage with a corresponding amplified heating current in the table is equal to the constant power;

obtaining a heating voltage corresponding to the amplified heating current in the table, the heating voltage is used as a standard heating voltage;

comparing the standard heating voltage with the actual heating voltage, determining whether the standard heating voltage is different from the actual heating voltage, and adjusting the actual heating voltage being equal to the standard heating voltage in order to make heating power be equal to the constant power;

a light emitting diode D1 is configured to display various operating conditions of the electronic cigarette;

the diode D2 is used to prevent the power supply module from reverse connection.

* * * * *